United States Patent Office 3,347,643
Patented Oct. 17, 1967

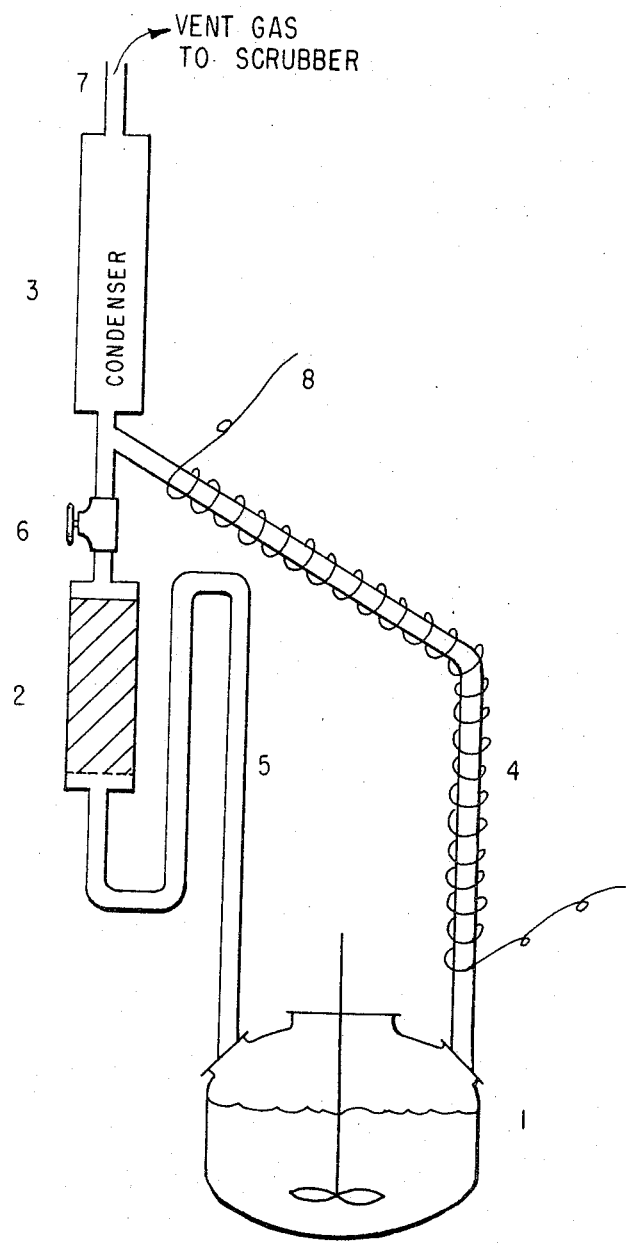

3,347,643
PHOSPHORUS-NITROGEN COMPOUNDS
Morris L. Nielsen, Dayton, Ohio, assignor to Monsanto Company, a corporation of Delaware
Filed Dec. 2, 1959, Ser. No. 856,710
4 Claims. (Cl. 23—357)

The present invention relates to a new process for the production of the trimer of phosphonitrilic chloride.

Methods have been described in the literature for preparing the trimer of phosphonitrilic chloride, but such methods have been characterized by quite low yields such as about 35% yield based upon the starting components. It has now been found that the present method using a solvent extraction step makes it possible to achieve yields of the order of about two times as much as the prior art in the production of this desired compound.

The reactants employed in the present invention are phosphorus pentachloride and ammonium chloride. The reaction is conducted in a liquid medium (e.g., liquid at 130–150° C. reaction conditions). In the preferred embodiment of the invention, the medium is a solvent for the phosphorus pentachloride and the phosphonitrilic chlorides. Typical solvents include halogenated compounds such as cyclohexyl chloride, n-heptyl chloride, benzyl chloride, n-octyl chloride, chlorobenzene, o-chlorotoluene, m-chlorotoluene, p-chlorotoluene, m-dichlorobenzene, o-dichlorobenzene, p-chloroethylbenzene, 1,2,3 - trichlorobenzene, p-dichlorobenzene, 1,2,4,5 - tetrachlorobenzene, 1,2,3 - trichloropropane, pentachloroethane, heptachloropropane, and phosphonitrilic chloride polymers. A still more preferred group are the halogenated hydrocarbons which boil in the range of from 130° C. to 150° C., such as tetrachloroethane and chlorobenzene.

Phosphonitrilic chloride polymers, e.g., a heel from a completed reaction, or the separated trimeric phosphonitrilic chloride may be used as examples of the halogenated solvents.

In conducting the reaction, the ammonium chloride is maintained in dispersed form in the liquid reaction medium, such as by adding the desired batch proportion at the start of the run or by continuous addition. The phosphorus pentachloride is then added gradually such as by refluxing a solvent into an extractor containing the phosphorus pentachloride or by gradual addition of solid or vaporized phosphorus pentachloride directly into the reactor. In a preferred embodiment of the invention, the rate of addition of the phosphorus pentachloride is controlled so that the amount of the phosphorus pentachloride which is dissolved in the reaction mixture is not greater than 5% (by weight) in excess of the theoretical amount reacting with the ammonium chloride during any interval of time such as an instantaneous interval.

The reaction temperature is maintained at 120° C. to 160° C., a preferred range being 130° C. to 150° C. The pressure is not critical and may be maintained at any desired level which yields the above temperatures.

The following examples illustrate specific embodiments of the invention:

Example 1

The method employed is described in connection with the accompanying drawing which illustrates one embodiment of the invention, but is not limitative thereon. In the reaction system of the drawing, reactor 1 was charged with 3500 ml. of anhydrous 1,1,2,2 - tetrachloroethane and 150 grams dry ammonium chloride. Extractor 2 contained 454 grams of phosphorus pentachloride. On heating reactor 1, vapors of tetrachloroethane passed up tube 4 (heated by electrical winding 8) to condenser 3 having a vent 7. Liquefied tetrachloroethane then passed downward through valve 6 into extractor 2, filling it and dissolving phosphorus pentachloride. The solution then passed through trap 5 into reactor 1, where heating and stirring occurred. By suitable adjustment of valve 6, the addition of phosphorus pentachloride to reactor 1 was extended over a period of about sixteen hours. The heating and stirring in reactor 1 were continued for an additional six hours, whereupon the reaction mixture was cooled to about 50° C. and filtered to remove unreacted ammonium chloride.

The filtrate was returned to a distillation unit and fractionated as follows:

(1) $b_{12mm.}$, 35–85° C. ____Solvent.
(2) $b_{1mm.}$, to 200° C. ____Mixed $PNCl_2$ higher polymers.
(3) Pot bottoms _____Residue.

To separate the desired trimeric phosphonitrilic chloride, Fraction 2 was again fractionated, isolating that portion boiling at 115–130° C. at 10 mm. The yield was 172 grams, representing 68% of theory.

Example 2

This example illustrates the prior art process.

A mixed charge of 400 grams of $PCl_5$ and 130 g. of ammonium chloride were heated together in a liter of 1,1,2,2 - tetrachloroethane at reflux for 20 hours. The mixture was cooled and filtered to remove excess $NH_4Cl$. The solvent was distilled off at 11 mm. and 50° C. and the residue washed with cold benzene. The insoluble portion of the residue, consisting of about 75% trimer, was recrystallized from benzene and distilled at 10 mm. The yield of trimer, distilling at 124° C. was about 70 grams, representing 32% of theory. In other runs, the product fraction boiling at 115° C.–130° C. at 10 mm. gave the same yield.

Example 3

In addition to the extraction-addition of phosphorus pentachloride in dissolved form into the reaction mixture containing ammonium chloride dispersed in a solvent such as tetrachlorethane, another method consists in adding the phosphorus pentachloride in solid form by the use of a suitable mechanism such as a screw feed or star wheel. The rate of addition of the solid phosphorus pentachloride is controlled so that the amount of the phosphorus pentachloride which is dissolved in the reaction mixture is not greater than 5% in excess of the theoretical amount reacting with the ammonium chloride during any interval of time, such as an instantaneous interval. The phosphorus pentachloride dissolved in the reaction mixture may be measured by various means such as nuclear magnetic resonance or light absorption in the visible region. For example, when following the course of the reaction by measurement of the nuclear magnetic resonance, it is possible to determine the ratio of the phosphorus which has undergone reaction, and the phosphorus present as dissolved $PCl_5$ (e.g., 1% by weight).

In an experiment, when 454 grams of phosphorus pentachloride were added gradually as a granular solid during a 24 hour period to 3500 ml. of anhydrous 1,1,2,2 - tetrachlorethane and 150 grams of dry ammonium chloride at 140–150° C., the reaction products obtained were similar to those of Example 1.

Example 4

In another embodiment of the invention a solvent such as tetrachlorethane is employed as a circulating reflux medium. The solvent is flashed from the reaction vessel to a condenser-extractor unit where it becomes saturated with phosphorous pentachloride, and the mixture then returned to the reaction vessel. The reaction vessel contains a minimum amount of this solvent, e.g., one-third of the total medium, by weight.

When this method of operation was applied to the reaction system of Example 1, but with about 3000 ml. of solvent being held in the extractor, and 1000 ml. in the reactor, the reaction mixture obtained contained fractions similar to those described in Example 1.

What is claimed is:
1. Process for the production of the trimer of phosphonitrilic chloride which comprises reacting phosphorus pentachloride with ammonium chloride, the ammonium chloride being dispersed in a liquid chlorinated solvent, non-reactive with the said phosphorus pentachloride and ammonium chloride and boiling in the range of from 130° C. to 150° C., and with the phosphorus pentachloride being gradually added thereto to reduce the formation of higher polymers, the rate of addition of the said phosphorus pentachloride being controlled so that the amount of the phosphorus pentachloride which is dissolved in the reaction mixture is not greater than 5% by weight in excess of the theoretical amount reacting with the ammonium chloride.

2. Process as in claim 1, in which the said reaction is conducted in a solvent which is a halogenated hydrocarbon boiling between 130° C. and 150° C., the solvent having initially dispersed therein, ammonium chloride and the said solvent being at least in part, vaporized from the reaction zone, and passed into contact with phosphorus pentachloride to dissolve phosphorus pentachloride in an extraction zone, and returning the solvent plus phosphorus pentachloride to the reaction zone.

3. Process as in claim 1, in which the said phosphorus pentachloride is vaporized into the reaction zone.

4. Process as in claim 1, in which the solvent is a trimer of phosphonitrilic chloride.

References Cited
UNITED STATES PATENTS

| | | | |
|---|---|---|---|
| 2,277,778 | 3/1942 | Randall. | |
| 2,782,133 | 2/1957 | Vallette | 23—14 |
| 2,788,286 | 4/1957 | Teja et al. | 23—14 |
| 2,872,283 | 2/1959 | Taylor | 23—14 |
| 2,998,297 | 8/1961 | Gregor et al. | 23—14 |

OTHER REFERENCES

Groggins et al., "Unit Processes in Organic Synthesis," 5th ed., 1958, pp. 40–43.

Steinman et al., "Journal of the American Chemical Society," vol. 64, pp. 2377–2378 (1942).

Yost & Russell, "Systematic Inorganic Chemistry," Published by Prentice-Hall, Inc. New York, 1944, pp. 108–113.

MILTON WEISSMAN, *Primary Examiner.*

MAURICE A. BRINDISI, OSCAR R. VERTIZ,
*Examiners.*

M. N. MELLER, *Assistant Examiner.*